United States Patent [19]

Taubinger et al.

[11] 4,133,800

[45] Jan. 9, 1979

[54] POLYESTER PRODUCTION

[75] Inventors: Robert P. L. V. Taubinger, Hertford; Robert B. Rashbrook, Hatfield, both of England

[73] Assignee: Imperial Chemical Industries Limited, London, England

[21] Appl. No.: 742,000

[22] Filed: Nov. 15, 1976

Related U.S. Application Data

[63] Continuation of Ser. No. 541,695, Jan. 16, 1975, abandoned.

[30] Foreign Application Priority Data

Jan. 28, 1974 [GB] United Kingdom ............... 3831/74

[51] Int. Cl.² ............................................. C08G 63/36
[52] U.S. Cl. ............................ 260/45.7 PH; 528/273; 528/283; 528/309
[58] Field of Search ........................... 260/75 R, 75 M

[56] References Cited

U.S. PATENT DOCUMENTS

| | | | |
|---|---|---|---|
| 3,651,017 | 3/1972 | Tanabe | 260/75 R |
| 3,795,639 | 3/1974 | Chimura | 260/75 R |

FOREIGN PATENT DOCUMENTS

| | | |
|---|---|---|
| 2164348 | 7/1972 | Fed. Rep. of Germany. |
| 782036 | 8/1957 | United Kingdom. |
| 1091234 | 11/1967 | United Kingdom. |
| 1197004 | 7/1970 | United Kingdom. |
| 382275 | 1973 | U.S.S.R. |

*Primary Examiner*—Paul R. Michl
*Attorney, Agent, or Firm*—Cushman, Darby & Cushman

[57] ABSTRACT

Polyesters, e.g. polyethylene terephthalate, are produced by a direct esterification process. The esterification is performed in the presence of a germanium dioxide polycondensation catalyst dissolved in an alkaline ethylene glycol solution. The alkali in the catalyst solution acts as the softening point stabilizer. An antimony polycondensation catalyst is also employed.

3 Claims, No Drawings

POLYESTER PRODUCTION

This is a continuation of application Ser. No. 541,695 filed Jan. 16, 1975, now abandoned.

This invention relates to polyester production and in particular to the production of linear aromatic polyesters.

Such polyesters are normally produced by first forming a monomeric ester by esterification of an aromatic carboxylic acid, e.g. terephthalic acid, with ethylene glycol (so called direct esterification) or an ester interchange reation by reacting a glycol with ethylene dialkyl ester of the acid, e.g. dimethyl terephthalate. The "monomer", e.g. bis($\omega$-hydroxy alkyl) terephthalate, is then polycondensed. The present invention is concerned with the direct esterification process.

The polycondensation reaction is normally conducted in the presence of a catalyst such as a germanium or an antimony compound.

Germanium compounds are particularly useful as they generally give polyesters of improved colour compared with the use of antimony compounds but it has been found that the use of a combination of germanium and antimony compounds give particularly good polyesters.

Germanium dioxide is the most commonly used germanium catalyst but the most readily obtainable form thereof, viz hexagonal crystalline germanium dioxide, is only poorly soluble in the reaction medium. Various methods have been proposed for improving its solubility and, in particular, it has been proposed, in British Patent 1,197,004, to make an alkaline solution of the crystalline germanium dioxide in a glycol.

In the direct esterification process it is conventional practice to utilise a base, such as sodium hydroxide, as a softening point stabiliser (see British Patent 782,036).

We have found that if the alkaline germanium dioxide/ethylene glycol solution is present during the esterification process, polyesters of enhanced softening point and improved colour are obtained compared with processes wherein simply a base is used as a softening point stabiliser and the germanium dioxide solution is added after the esterification process has taken place.

Accordingly we provide a process for the production of a linear aromatic polyester comprising esterifying at least one aromatic dicarboxylic acid with ethylene glycol at an elevated temperature in the presence of a solution containing 10 to 200 parts per million parts by weight of the dicarboxylic acid of hexagonal crystalline germanium dioxide, and at least one equivalent of an alkali metal hydroxide per mole of germanium dioxide, dissolved in a diol having its hydroxyl groups attached to adjacent carbon atoms, and thereafter subjecting the product of the esterification reaction, without isolation, to a polycondensation reaction under a reduces pressure in the presence of from 100 to 1000 parts per million parts by weight of the dicarboxylic acid originally employed of antimony trioxide.

Aromatic dicarboxylic acids that may be used are those in which the carboxylic acid group is attached directly to an aromatic nucleus. Both carboxylic acid groups may be attached to the same aromatic nucleus as in terephthalic acid, isophthalic acid, phthalic acid, 2,5-, 2,6-, or 2,7-naphthalene dicarboxylic acid. Alternatively they may be attached to linked aromatic nuclei, as in bibenzoic acid and 1,2-diphenoxyethane 4:4'-dicarboxylic acid. Terephthalic acid is preferred.

Examples of diols suitable for use in the germanium dioxide solution include ethylene glycol, propane-1:2-diol, butane-1:2-diol and butane-2:3-diol. We prefer to use ethylene glycol, particularly where the glycol to be condensed with the dicarboxylic acid is ethylene glycol.

It will be appreciated that copolyesters may be produced by using a mixture of two or more dicarboxylic acids and/or two or more glycols.

The invention is particularly of use in the production of polyethylene terephthalate from terephthalic acid and ethylene glycol.

It is important that at least one equivalent of the alkali metal hydroxide is used for each mole of germanium dioxide in order to ensure that the latter is dissolved. Thus, when using sodium hydroxide, for each 100 parts by weight of germanium dioxide, at least 38.2 parts of sodium hydroxide should be used. In place of sodium hydroxide, hydroxides of other alkali metals, e.g. lithium, potassium, rubidium and caesium may be employed. However, for economic reasons, sodium hydroxide is preferred.

We have found that the addition of too much of the alkali metal hydroxide adversely affects the colour of the product and so we prefer to use less than 2, particularly less than 1.5, equivalents per mole of germanium dioxide.

The amount of germanium dioxide used is 10 to 200 parts per million parts by weight of the dicarboxylic acid utilised. However, where small amounts, i.e. at the lower end of this range, of germanium dioxide are used, more than 2 equivalents of alkali metal hydroxide may be used for each mole of germanium dioxide. Thus, the amount of alkali metal hydroxide is preferably within the range 0.5–2.5, preferably 0.75–2.0, gram equivalents per million grams of the dicarboxylic acid, i.e. for sodium hydroxide 20–100, preferably 30–80, parts per million parts by weight of dicarboxylic acid.

The amount of diol used to form the germanium catalyst solution should be sufficient to ensure dissolution of the germanium dioxide and alkali metal hydroxide.

The amount of antimony trioxide used as additional polycondensation catalyst should be sufficient to ensure an acceptable polycondensation rate is obtained. The amount used is in the range 100–1000, preferably 200–750, parts per million parts by weight of dicarboxylic acid originally employed. The antimony trioxide is generally added after completion of the esterification reaction and then, while maintaining the reaction medium at an elevated temperature, the prevailing pressure reduced to effect polycondensation.

Other additives commonly employed in polyester manufacture may be added at a suitable stage in the process, generally before or during the polycondensation reaction. Examples of such additives are phosphorus compounds, such as oxyacids of phosphorus, e.g. phosphoric or phosphorous acids, or salts or esters thereof, dyeing assistants, delustrants, fillers, optical whiteners, dyes, pigments and chain extenders.

The esterification reaction is conducted at an elevated temperature, generally in the range 200–280° C, generally under elevated pressure, with removal of water by distillation.

The polycondensation reaction is generally conducted at a temperature in the range of 250–300° C under a reduced pressure, generally less than 30 mm of mercury, with removal of the evolved glycol.

The invention is particularly suited to the production of polyesters for fibre or film manufacture.

The invention is illustrated by the following examples wherein all parts and percentages are expressed by weight.

(Examples I, II and IV are comparative).

EXAMPLE I 60.5 parts of terephthalic acid and 38.8 parts ethylene glycol were esterified under a pressure of 40 psi at a temperature of 240° C in the presence of 0.0035 parts sodium hydroxide. 0.07 parts triphenyl phosphate stabiliser were then added after sterification, followed by 0.0035 parts of amorphous germanium dioxide and 0.021 parts antimony trioxide were added as polycondensation catalyst. Polycondensation was completed by raising the temperature to 290° C and applying a vacuum of 0.1 mm of mercury. The resultant polymer had an intrinsic viscosity (IV) — as measured on a 1% solution in o-chlorophenol at 25° C — of 0.658, a yellowness of 30 units and softening point of 255.4° C. The yellowness figure quoted is a measurement of the colour of the sample obtained on a "colormaster" differential colorimeter. The higher the yellowness figure, the poorer the colour of the polymer.

EXAMPLE II

Polymer was made as described in Example I but instead of amorphous germanium dioxide, 0.0035 parts hexagonal germanium dioxide dissolved in an ethylene glycol solution containing 0.0014 parts sodium hydroxide were added after esterification together with the antimony trioxide as polycondensation catalyst. The resultant polymer had an IV of 0.694, a yellowness of 40 units and a softening point of 255.1° C.

EXAMPLE III 60.5 parts terephthalic acid and 38.8 parts ethylene glycol were esterified under the conditions described in Example I but in the presence of 0.0035 parts hexagonal germanium dioxide dissolved in an ethylene glycol solution containing the 0.0035 parts sodium hydroxide. 0.07 parts triphenyl phosphate stabiliser and 0.021 parts antimony trioxide catalyst were added after esterification and polycondensation completed as in Examples I and II. The polymer of IV 0.682 gave a yellowness of 27 units and a softening point of 256.7° C.

EXAMPLE IV 86.5 parts terephthalic acid and 42 parts ethylene glycol were esterified at a temperature of 241° C and a pressure of 2.8 atmospheres in the presence of 0.005 parts sodium hydroxide. 0.21 parts triphenyl phosphate as stabiliser and 0.005 parts hexagonal germanium dioxide, dissolved in an ethylene glycol solution containing 0.002 parts sodium hydroxide, and 0.03 parts antimony trioxide as polycondensation catalyst were then added. Polycondensation was completed by raising the temperature to 290° C and decreasing the pressure to 0.1 mm mercury pressure. The polymer had an IV of 0.658, a yellowness of 32 units and softening point of 258.8° C.

EXAMPLE V 86.5 parts terephthalic acid and 42 parts ethylene glycol were esterified at a temperature of 241° C and pressure of 2.8 atmospheres in the presence of 0.005 parts hexagonal germanium dioxide dissolved in an ethylene glycol solution containing 0.005 parts sodium hydroxide. 0.21 parts triphenylphosphate and 0.03 parts antimony trioxide were added after esterification and the polycondensation was completed as in Example IV. The polymer had an IV of 0.645, yellowness of 25 units and softening point 259.2° C.

We claim:

1. In a process for the production of a linear aromatic polyester which comprises:
   (a) esterifying at least one aromatic dicarboxylic acid with ethylene glycol at an elevated temperature and in the presence of an alkali metal hydroxide;
   (b) polycondensing the product of (a), without isolation, under reduced pressure and in the presence of antimony trioxide in amount 100 to 1,000 parts per million by weight of the dicarboxylic acid originally present and triphenyl phosphate stabilizer;

the improvement which comprises carrying out step (a) in the presence of a solution of germanium dioxide in an alkali metal hydroxide and a diol having its hydroxyl groups attached to adjacent carbon atoms, the amount of germanium dioxide being 10 to 200 parts per million by weight based on the amount of dicarboxylic acid present at the start of the reaction and the amount of the alkali metal hydroxide is at least one equivalent per mole of the germanium dioxide, said antimony trioxide being added to the product of (a) after completion of the esterification reaction and the amount of said alkali metal hydroxide is:
   (i) greater than the equivalent per mole of germanium dioxide;
   (ii) greater than 0.5 gram equivalents per million grams of the dicarboxylic acid;
   (iii) less than the greater of twice the equivalent per mole of germanium dioxide and 2.5 gram equivalents per million grams of the dicarboxylic acid.

2. A method according to claim 1, in which terephthalic acid is esterified with ethylene glycol and then polycondensed to give polyethylene terephthalate.

3. In a process for the production of polyethylene terephthalate which comprises:
   (a) esterifying terephthalic acid with ethylene glycol at an elevated temperature and in the presence of sodium hydroxide;
   (b) polycondensing the product of (a), without isolation, under reduced pressure and in the presence of antimony trioxide in amount 100 to 1,000 parts per million by weight of the terephthalic acid originally present and triphenyl phosphate stabilizer;

the improvement which comprises carrying out step (a) in the presence of a solution of germanium dioxide in sodium hydroxide and ethylene glycol, the amount of germanium dioxide being 10 to 200 parts per million by weight based on the amount of terephthalic acid present at the start of the reaction and the amount of the sodium hydroxide is at least 38.2 parts by weight per 100 parts by weight of the germanium dioxide, said antimony trioxide being added to the product of (a) after completion of the esterification reaction and the amount of said sodium hydroxide is:
   (i) greater than 38.2 parts by weight per 100 parts by weight of germanium dioxide;
   (ii) greater than 20 parts by weight per million parts by weight of the terephthalic acid;
   (iii) less than the greater of 76.4 parts by weight per 100 parts by weight of germanium dioxide and 100 parts by weight per million parts by weight of terephthalic acid.

* * * * *